(12) United States Patent
Raghavan et al.

(10) Patent No.: US 8,141,060 B2
(45) Date of Patent: Mar. 20, 2012

(54) CALLING AN ENTITY OF A GRAPHICAL MODEL WITH A NON-GRAPHICAL ENTITY AND CALLING A NON-GRAPHICAL ENTITY OF A GRAPHICAL MODEL WITH A GRAPHICAL ENTITY

(75) Inventors: Vijay Raghavan, Framingham, MA (US); Pieter J. Mosterman, Framingham, MA (US); Yao Ren, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 928 days.

(21) Appl. No.: 11/842,063

(22) Filed: Aug. 20, 2007

(65) Prior Publication Data
US 2009/0007079 A1 Jan. 1, 2009

Related U.S. Application Data

(63) Continuation of application No. 11/417,025, filed on May 3, 2006.

(51) Int. Cl.
G06F 9/44 (2006.01)
(52) U.S. Cl. ...................................................... 717/135
(58) Field of Classification Search .................. 717/105, 717/109, 135; 715/211, 700, 762–763, 502; 702/188; 716/3; 707/101
See application file for complete search history.

(56) References Cited

U.S. PATENT DOCUMENTS

| | | | |
|---|---|---|---|
| 6,173,438 B1 | 1/2001 | Kodosky et al. | |
| 6,282,699 B1 | 8/2001 | Zhang et al. | |
| 6,415,434 B1 | 7/2002 | Kind | |
| 6,868,526 B2 | 3/2005 | Singh et al. | |
| 6,889,172 B2 | 5/2005 | Sierer et al. | |
| 7,024,631 B1 | 4/2006 | Hudson et al. | |
| 2003/0097421 A1 | 5/2003 | Wille et al. | |
| 2003/0101025 A1 | 5/2003 | Shah et al. | |
| 2004/0210592 A1* | 10/2004 | Ciolfi et al. | 707/101 |
| 2004/0210831 A1* | 10/2004 | Feng et al. | 715/502 |
| 2004/0233232 A1 | 11/2004 | Iborra et al. | |
| 2007/0256038 A1 | 11/2007 | Manohar | |

OTHER PUBLICATIONS

The MathWorks, "Stateflow and Stateflow Coder", User's Guide Version 5, 1997-2002, chp. 4-8 <stateFlw4-8.pdf>.*
Kacsuk, Péter et al., "Designing parallel programs by the graphical language GRAPNEL," *Microprocessing and Microprogramming*, vol. 41:625-643 (1996).
The MathWorks, "Simulink®, Model-Based and System-Based Design," Using Simulink, Version 5, The MathWorks, Inc., (2004).
The MathWorks, "Stateflow and Stateflow® Coder, for Use with Simulink®," User's Guide, Version 6, The Mathworks, Inc., (2004).
International Search Report for Application No. PCT/US2007/010987, dated Feb. 27, 2008.
European Office Action for Application No. 07794603, dated Jan. 28, 2010.

* cited by examiner

*Primary Examiner* — Tuan Anh Vu
(74) *Attorney, Agent, or Firm* — Nelson Mullins Riley & Scarborough LLP

(57) ABSTRACT

The present invention provides a graphical model in a computing environment, where the graphical model includes at least a caller entity. A call command associated with the caller entity is executed, where the call command includes at least a partial name of the callee entity. The at least one callee entity may be identified based on the partial name of the at least one callee entity provided in the call command. The at least one callee entity may then be called.

16 Claims, 13 Drawing Sheets

CALLING AN ENTITY OF A GRAPHICAL MODEL WITH A NON-GRAPHICAL ENTITY AND CALLING A NON-GRAPHICAL ENTITY OF A GRAPHICAL MODEL WITH A GRAPHICAL ENTITY

CROSS-REFERENCE TO RELATED APPLICATION

This application is a continuation of U.S. patent Ser. No. 11/417,025, entitled "CALLING AN ENTITY OF A GRAPHICAL MODEL WITH A NON-GRAPHICAL ENTITY AND CALLING A NON-GRAPHICAL ENTITY OF A GRAPHICAL MODEL WITH A GRAPHICAL ENTITY," filed May 3, 2006, the disclosure of which is incorporated by reference herein.

FIELD OF THE INVENTION

This invention relates to graphical models in a graphical modeling environment. More specifically, this invention relates to calling an entity of a graphical model directly with a non-graphical entity of the graphical model, and calling a non-graphical entity of a graphical model directly with a graphical entity of the graphical model

BACKGROUND

Graphical modeling has spawned a variety of software products such as Simulink® from The MathWorks, Inc. of Natick, Mass., that cater to various aspects of dynamic system simulation, analysis and design. Such products allow users to perform various types of tasks including constructing system models through a user-interface that allows drafting block diagram models, allowing augmentation of a pre-defined set of blocks with custom user-specified blocks, the use of the block diagram model to compute and trace the temporal evolution of the dynamic system ("executing" the block diagram), and automatically producing either deployable software systems or descriptions of hardware systems that mimic the behavior of either the entire model or portions of it (referred to herein as "code generation"). Each of the tasks listed above has many intricate details and subtle variations.

In addition, Simulink® also provide for non-graphical language to be included in graphical models. A graphical model created in Simulink® may, for example, contain programming language statements or instructions in the technical computing language of MATLAB®. The computational language of MATLAB® can support distributed computation and hardware description language code generation. Non-graphical or textual language, such as embedded MATLAB®, may be used to implement one or more entities of the graphical model. In this manner, a graphical model may comprise graphical and non-graphical entities, and the non-graphical entities may include any type of suitable text, such as any programming language including those that are dynamically typed.

A limitation with graphical modeling environments, however, is the inability to call a graphical entity (a callee) from a non-graphical (a caller) entity and the inability to call a non-graphical entity (a callee) from graphical or non-graphical entity (a caller).

SUMMARY OF THE INVENTION

In one aspect of the present invention, a computing device-implemented method may include providing a graphical model in a computing environment, where the graphical model includes a caller entity; executing a call command associated with the caller entity, where the call command includes a call to a callee entity based on a name of the callee entity; identifying the callee entity based on the name of the callee entity provided in the call command; and calling the callee entity.

In another aspect of the present invention, a computer-readable medium that stores instructions executable by at least one processor, is provided. The computer-readable medium may include one or more instructions for providing a computing environment for interacting with a graphical model, the graphical model including a group of blocks, each of the group of blocks being associated with a function or operation; one or more instructions for executing a call command associated with a first block among the group of blocks, the call command including a call to at least one second block based on at least a partial name of the at least one second block and a signature associated with the call command; one or more instructions for identifying the at least one second block based on the partial name and signature associated with the call command; and one or more instructions for calling the at least one second block.

In still another aspect of the present invention, a system may include means for providing a caller entity in a graphical model; means for executing a call command associated with the caller entity, the call command identifying a callee entity associated with a second graphical model based on at least a partial name of the callee entity and a signature associated with the callee entity; means for resolving an identity of the callee entity based on the a partial name of the callee entity and a signature associated with the callee entity; and means for calling the callee entity based on the resolved identity.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
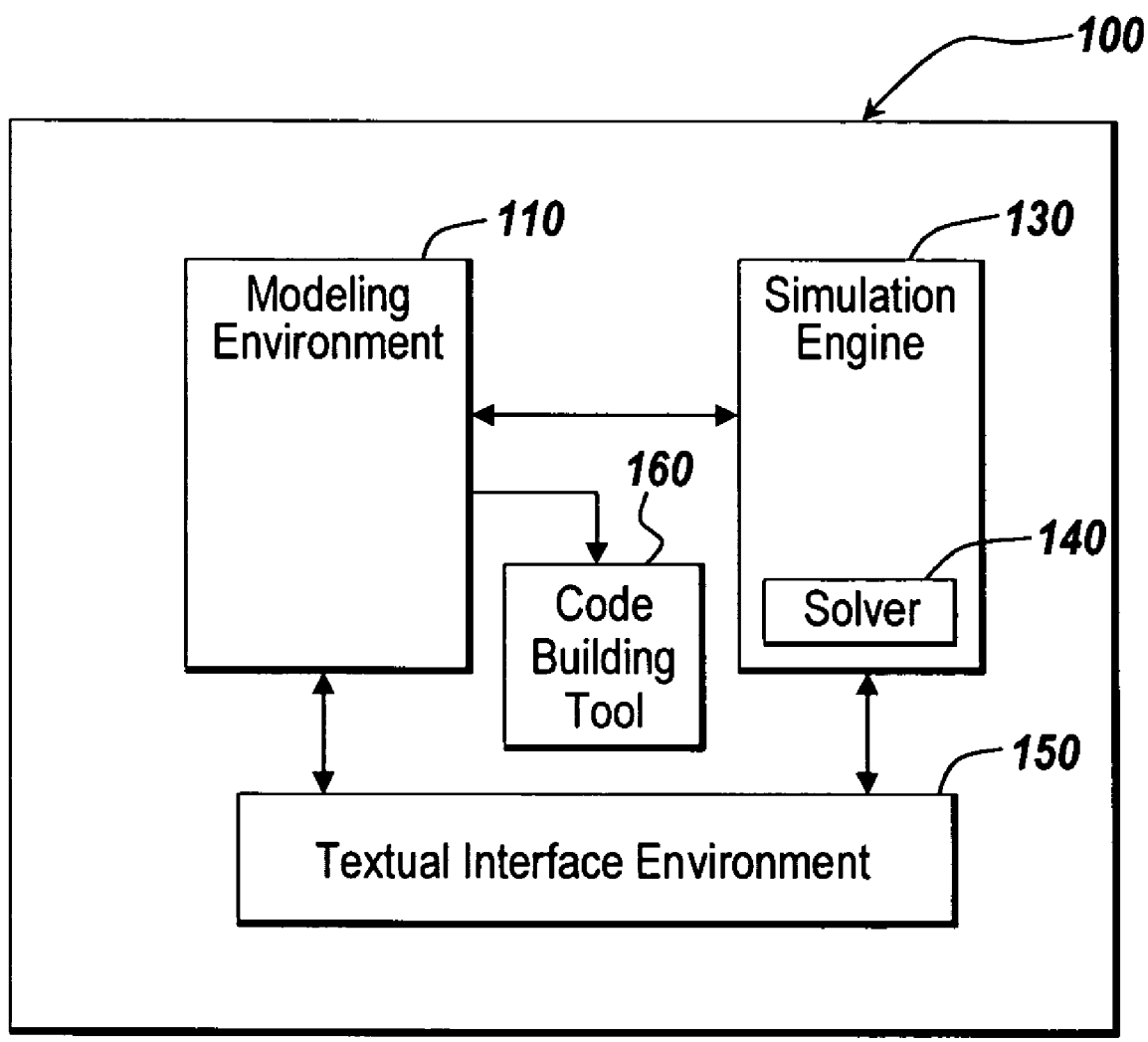
FIG. 1 depicts a high-level block diagram of an exemplary simulation tool that may be used for implementing the illustrative embodiment of the present invention.

The illustrative embodiment of the present invention allows graphical entities or non-graphical entities (caller) in a graphical model to call another entity (callee) of the graphical model. The callee entity can be in the graphical model or may be referenced in the graphical model such that the actual entity does not reside in the graphical model, but is incorporated as part of the graphical model by reference.

In one example, a non-graphical entity (caller) composed of textual language may execute a sequence of commands that includes a call command that allows the non-graphical entity to call a graphical or another non-graphical entity (callee) directly. Additionally, the illustrative embodiment of the present invention allows a graphical entity to execute a call command to call a non-graphical entity directly.

In another example, the caller entity can call a callee entity that is referenced in the graphical model. In this manner, the callee can be textual language in a file that is distinct from the graphical model and that is stored on a computing device. The file can be accessible by local or global referencing, where the location of the file (callee) resides at a storage path or network path that is referenced in the graphical model. In this manner, the file can reside in a remote location, such as a server on a network. The file can be a JavaScript that is accessed via a uniform resource locator (URL). As a result, the present invention enables a purely textual entity to call a graphical or non-graphical entity in or referenced by a graphical model and enables a graphical entity to call a purely textual entity in or referenced by the graphical model.

In addition, the call command of the illustrative embodiment can be a service request using multi-thread technology, or middleware technology such as CORBA. In this case, the call command can be a synchronous or asynchronous type communication. If synchronous, it may halt execution of the graphical model until a return value is available. If asynchronous, the previously computed values may be read in a non-blocking manner till the return values overwrite the old values. It will be recognized by one skilled in the art that other implementations using call commands as service requests are possible.

Further, the call command that is executed by the caller entity can call a callee entity that can programmatically and dynamically change the graphical modeling environment as well or perform system calls such as the "shell" command. A callee entity can be configured, for example, to issue network commands in a protocol such as RS-232 to control instruments such as an oscilloscope. In this manner, the callee entity can issue a network command that enables, for example, an "autoscale" function of an oscilloscope in the oscilloscope. The callee entity may be configured to customize a user interface of the graphical modeling environment during execution of the graphical model, and for example, can dynamically measure and/or display a value of specific variables of the graphical model or can disable menus and options such as disabling parameter changes in certain operating modes. Further, the callee entity can be configured to dynamically change a textual aspect of an entity in the graphical model and save the change during the execution of the graphical model such that the change can be executed during the execution.

The various embodiments of the present invention allow these calls to be resolved to a selected entity in a graphical model using defined ports or a name and a signature, where a signature may be a number of arguments, types of the arguments, complexity of the arguments (i.e., real and/or imaginary numbers) or dimensions of the arguments of the function that is called. This feature enables function overloading in the graphical model, allowing two or more functions to have an identical name, but different signatures. The illustrative embodiment further provides use of a hyperlink to allow a user to navigate from a caller entity to a callee entity or to allow the user to navigate from the callee entity to the caller entity.

The illustrative embodiment will be described solely for illustrative purposes relative to the technical computing environment of MATLAB®, and the Simulink® product family including Stateflow® and SimEvents® from The MathWorks, Inc. of Natick, Massachusetts.

Simulink® includes blocks that can be used in block diagrams of dynamic systems to implement functions commonly used in modeling of dynamic systems. These blocks include, but are not limited to continuous and discrete dynamics blocks, such as integration and unit delay; algorithmic blocks, such as sum, product, and lookup tables; and structural blocks, such as multiplexers, switches, and signal and bus selectors. A user can alter these predefined blocks or create customized blocks. Simulink® may be used, for example, to model systems for aerospace, communications, signal processing, mechanical systems and electrical systems as well as other systems. A user may also implement user specified blocks that contain programming language statements or instructions in the technical computing language of MATLAB®.

Stateflow® enables development of state diagram models that can be graphical representations of state machines, such as either an infinite state machine, a finite state machine, or a non-deterministic state machine, where states and transitions form the building blocks of a system. Stateflow® can provide elements such as states, junctions, and functions, such as graphical functions of Simulink® and/or Stateflow® and can provide a graphical model or a block in a graphical model. A state diagram provided by Stateflow® can represent a Moore or Mealy machine. Stateflow® further enables the generation of a hardware description representation of a state diagram and may restrict the hardware description language representation to a Moore or Mealy machine. Stateflow® can also provide any other restrictions for the code generation process or in the development of the state diagrams.

Although the illustrative embodiment will be described relative to a MathWorks-based application, one of ordinary skill in the art will appreciate that the present invention may be applied to other graphical modeling environments and technical computing environments, such as any graphical modeling or technical computing environments using software products of LabVIEW®, MATRIXx from National Instruments, Inc., Mathematica® from Wolfram Research, Inc., Mathcad of Mathsoft Engineering & Education Inc., Maple™ from Maplesoft, a division of Waterloo Maple Inc., Dymola from Dynasism AB of Lund, Sweden, Extend from Imagine That, Inc. of San Jose, Calif., Scilab™ and Scicos included therein from The French National Institution for Research in Computer Science and Control (INRIA), Le Chesnay Cedix, France or MSC.Adams® from MSC.Software Corporation of Santa Ana, Calif. Furthermore, one ordinarily skilled in the art will appreciate that the present invention may apply to any graphical or text-based modeling environment, such as one providing modeling with hardware description language (HDL), physics modeling domains, or Unified Modeling Language (UML) like Rhapsody® from iLogix, Inc. of Toronto, Canada or Rational® from International Business Machines Corporation of Armonk, N.Y.

In addition, the illustrative embodiment can be implemented using declarative models. A declarative model is formulated in a denotational manner and does not specify how a particular behavior should be achieved. A declarative model only specifies what that behavior is. The operational implementation to generate such behavior is left open, thereby preventing over specification. For example, a declarative model of an electrical diode provides that the diode is active if the voltage is larger than a threshold and that the diode is inactive if the current is less than zero. In contrast to declarative models, operational models are considered imperative. An operational model provides, for example, that the diode model moves from inactive to active if the voltage is larger than a threshold and that the diode moves from active to inactive if the current is less than zero. Thus, operational models prescribe how the state changes occur, while declarative models prescribe the conditions for being in each state.

FIG. 1 is a high-level block diagram of an exemplary simulation tool 100 for modeling, simulating, and analyzing dynamic systems. The tool 100 may include a modeling environment 110, a simulation engine 130, and a textual interface environment 150. The simulation engine 130 communicates with the modeling environment 110. The simulation engine 130 receives a graphical model such as a block diagram generated using the modeling environment 110. The simulation engine 130 communicates refinements to models created in the modeling environment 110. The textual interface environment 150 interacts with the modeling environment. Such a textual interface environment may be MATLAB® from The MathWorks, Inc. of Natick, Mass. Using textual interface environment 150, a user may write a sequence of commands that may be incorporated as an entity of a graphical model in the modeling environment 110.

The simulation tool 100 may also have a code building tool 160 to generate code, such as source code, object code, a compiled executable, or library, for forming an executable of a graphical model provided by the modeling environment 110. The code building tool 160 can also be used to generate a hardware description language representation of the graphical model. The code building tool 160 may comprise a code building tool like Real-Time Workshop® from The MathWorks, Inc. of Natick, Mass., or any portion thereof that may be necessary to generate executable code, instructions, etc. in a programming language such as C or a hardware description language such as Verilog or VHDL. The code building tool 160 can generate source code for the execution of a graphical model that is provided by the modeling environment 110, compile the source code into object code and build an executable program, library or any other form of executable instructions. The code may be designed to run on any processor, microprocessor, dual-core processor, multi-core processor, cluster of processors, operating system, computational hardware device or component of a computational hardware device. In one embodiment, the code may comprise embedded code targeted to run on any type of embedded system. Additionally, the code can be customized to run on a specific target hardware platform.

One of ordinary skill in the art will also appreciate that the modeling environment 110, simulation engine 130, textual interface environment 150, and code building tool 160 may be provided on the same computing device, which will be described below in more detail with reference to FIG. 2, or alternatively, the modeling environment 110, simulation engine 130, and textual interface environment 150 may be coupled to each other via a communication network, which will be described below in more detail with reference to FIG. 3.

Figure 2:
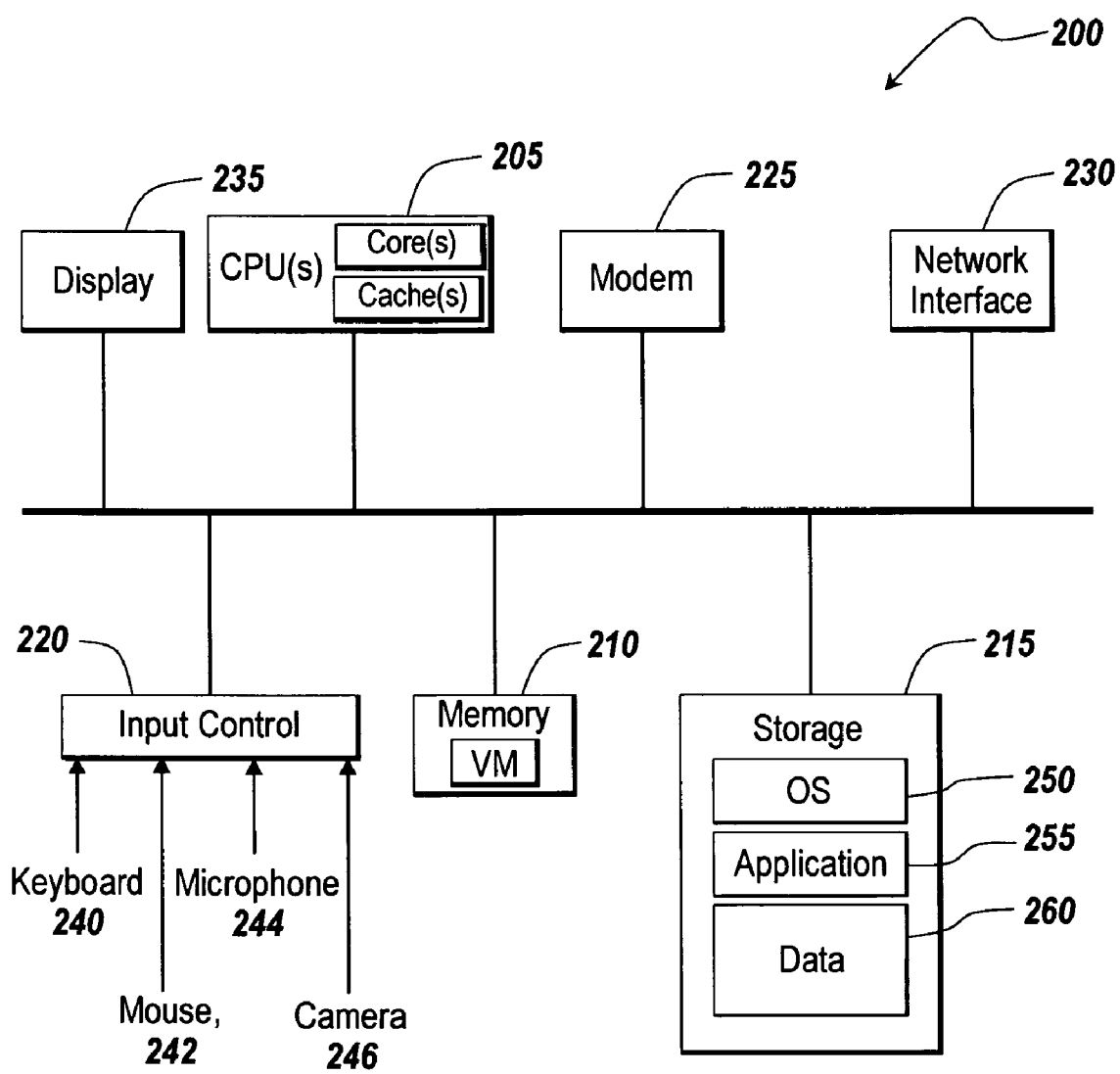
FIG. 2 depicts an exemplary computing device suitable for practicing the illustrative embodiment of the present invention

FIG. 2 is an exemplary computing device 200 suitable for practicing the illustrative embodiment of the present invention. One of ordinary skill in the art will appreciate that the computing device 200 is intended to be illustrative and not limiting of the present invention. The computing device 200 may take many forms, including but not limited to a personal computer, workstation, server, network computer, quantum computer, optical computer, bio computer, Internet appliance, mobile device, a pager, a tablet computer, and the like.

The computing device 200 may be electronic and include a Central Processing Unit (CPU) 205, memory 210, storage 215, an input control 220, a modem 225, a network interface 230, a display 235, etc. The CPU 205 controls each component of the computing device 200 to provide the modeling environment 110, simulation engine 130, textual interface environment 150, and code building tool 160. The memory 210 temporarily stores instructions and data and provides them to the CPU 205 so that the CPU 205 operates the computing device 200 and runs the modeling environment 110, simulation engine 130, textual interface environment 150, and code building tool 160.

Optionally, the computing device 200 may include multiple CPUs for executing software loaded in the memory 210, and other programs for controlling system hardware. Each of the CPUs can be a single or a multiple core processor. The code loaded in the memory 210 may run in a virtualized environment, such as in a Virtual Machine (VM). Multiple VMs may be resident on a single processor. Also, part of the application could be run in hardware, for example, by configuring a field programmable gate array (FPGA) or creating an application specific integrated circuit (ASIC). Further, the part of the applications may be run on analog electronic devices or other resources may be used to run part of the application, such as graphics processing units (GPUs) or dedicated hardware such as Finite Fourier Transform (FFT) processing blocks.

The storage 215 usually contains software tools for applications. The storage 215 includes, in particular, code 250 for the operating system (OS) of the device 200, code 255 for applications running on the operation system including the applications for the modeling environment 110, simulation engine 130, textual interface environment 150, code building tool 160 and data 260 generated from the modeling environment 110, simulation engine 130, textual interface environment 150, and code building tool 160. Those of ordinary skill in the art will appreciate that parts of the applications can be stored in the CPU cache or memory 210 as well, much like the data, and even the OS, or they can be stored on the network described below with reference to FIG. 3.

The input control 220 may interface with a keyboard 240, a mouse 242, a micro phone 244, a camera 246 such as a web camera and other input devices. The computing device 200 may receive through the input control 220 input data, such as the input data for developing a graphical model. The computing device 200 may display on the display 235 user interfaces for displaying the data generated from the modeling environment 110, simulation engine 130, textual interface environment 150, and code building tool 160.

Figure 3:
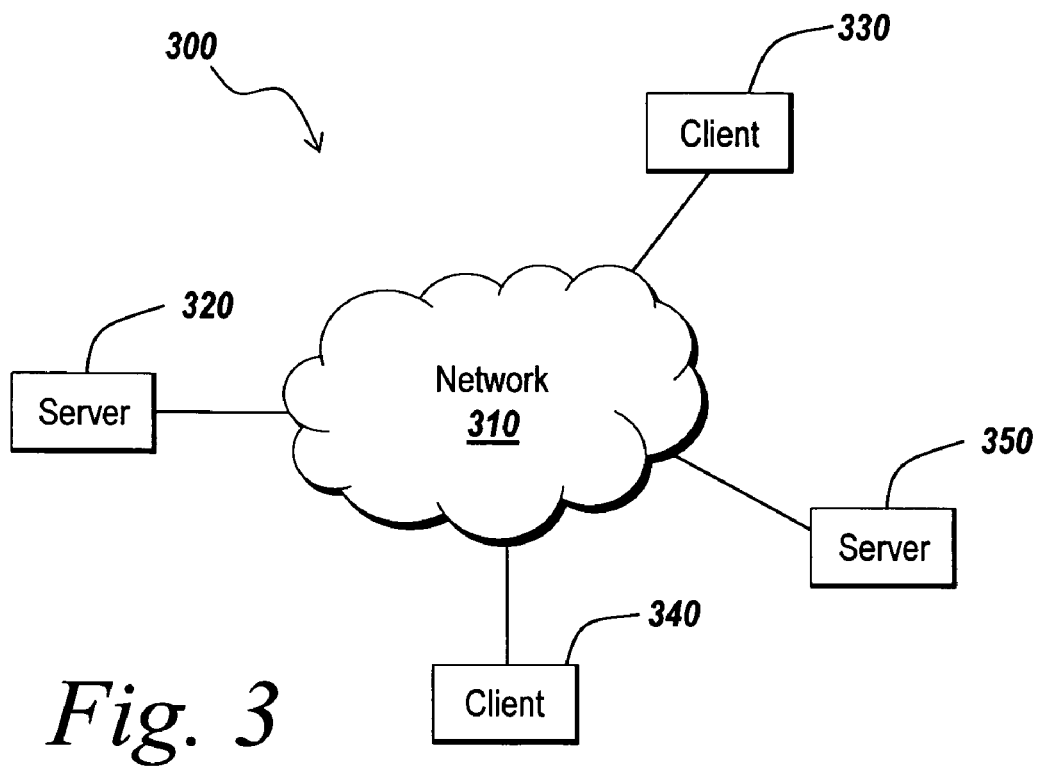
FIG. 3 depicts an exemplary distributed system suitable for the distributed implementation of the illustrative embodiment.

FIG. 3 is an exemplary network environment 300 suitable for the distributed implementation of the illustrative embodiment. The network environment 300 may include one or more servers 320 and 350 coupled to clients 330 and 340 via a communication network 310. The network interface 230 and the modem 225 of the computing device 200 enable the servers 320 and 350 to communicate with the clients 330 and 340 through the communication network 310. The communication network 310 may include Internet, intranet, LAN (Local Area Network), WAN (Wide Area Network), MAN (Metropolitan Area Network), wireless network (e.g., using IEEE 802.11 and Bluetooth), etc. The communication facilities can support the distributed implementations of the present invention.

In addition the network may use middleware, such as CORBA or DCOM to allow a computer on the network to communicate directly with another computer or device that is connected to the network. For example, a graphical model can be provided on client 330 and a caller entity in the graphical model can issue a service request to the server 320, such that the execution of the graphical model on the client 330 halts and the server 320 performs an operation requested in the service request. Upon completion of the operation, the server 320 transmits to the client 330 the result of the operation and the execution of the graphical model may resume or use the newly computed value without its execution having been blocked.

In the network environment 300, the servers 320 and 350 may provide the clients 330 and 340 with software components or products under a particular condition, such as a license agreement. The software components or products may include those for providing the modeling environment 110. The software components or products may also include those for the simulation engine 130, textual interface environment 150, and code building tool 160 coupled to the modeling environment 110. For example, the client 340 may perform the modeling of a dynamic system using a software component provided by the server 320 and send the server 320 the model for simulation. The server 320 then returns the simulation results to the client 340 and the client 340 may subsequently display the data to the user with the information on the data.

Figure 4:
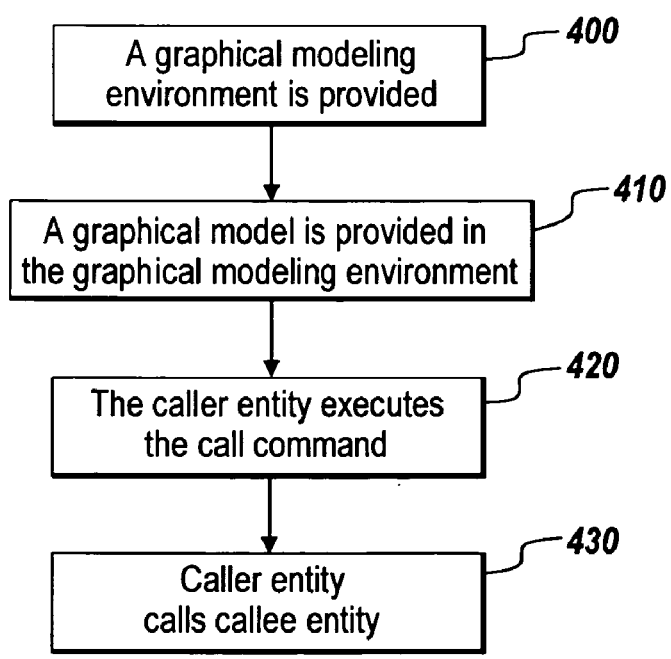
FIG. 4 depicts a flow diagram illustrating the steps performed allowing a non-graphical caller block that executes a sequence of commands to call a callee block from a call command in the sequence of commands.
Figure 5A:
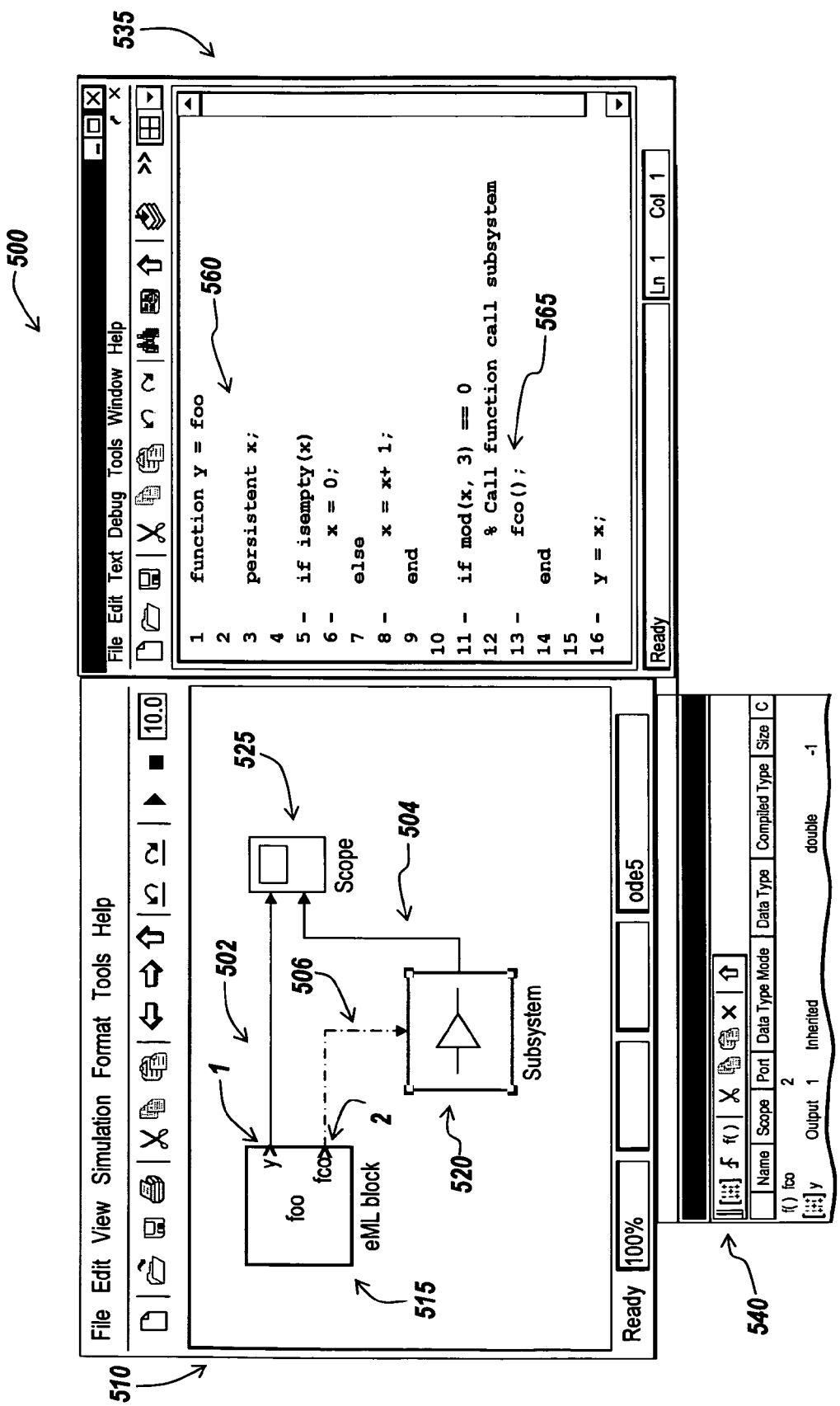
FIG. 5A depicts an exemplary block diagram and embedded code in the illustrative embodiment of the present invention that is suitable for implementing the steps performed in FIG. 4.

FIG. 4 provides a flow diagram of steps performed in the illustrative embodiment to implement a call command to call a callee entity from a caller entity, and FIG. 5A provides a block diagramming environment that is consistent with the steps performed in the illustrative embodiment as illustrated in FIG. 4. The illustrative embodiment provides a block diagramming environment 500 (Step 400). A block diagram 510 is provided in the block diagramming environment 500 (Step 410). The block diagram 510 includes an Embedded MATLAB block 515, a Simulink® subsystem 520, a scope 525, and an Embedded MATLAB script window 535. Embedded MATLAB blocks have two names one being the name of the block and the other being the name of the function executed by the block. For example, block 515 has a block name of "eML block" and a function name of "foo". The function name represents the name of the function that is performed by the sequence of commands when an Embedded MATLAB block executes. It would be recognized by those skilled in the art that block 515 may be any type of block in a block diagram that executes a sequence of commands or textual commands.

Embedded MATLAB block 515 is a non-graphical entity that provides a block diagram element of textual language. Block 515 executes a sequence of commands 560. The sequence of commands 560 executed by block 515 includes a call command 565, as a function call, that defines a function call output port 2, "fco". The fco is defined to be at an output port 2 of the block 515 in the port and data management window 540. Block 515 also has an output port 1 that provides an output "y" that is defined to be output on port 1 of block 515 in the port and data management window 540.

Block 520 is a Simulink® subsystem. Subsystems are provided primarily to help in the organization aspects of a block diagram and do not define a separate block diagram. A block diagram may be composed of levels of hierarchy. Each layer is defined by a subsystem. A subsystem is part of the overall block diagram. In this manner, a top view of a hierarchical block diagram model can provide a high-level view of the system with one or more blocks of this top view each representing a subsystem block diagram model. A user may descend into the subsystem view from the top level to view the details of this sub-system model. The block diagram model of the sub-system can also include a multitude of blocks, and in turn, some of these blocks may represent additional block diagram models and details of further sub-systems. As such, a hierarchical model may be constructed with hundreds or more block diagram models in a multitude of levels with hundreds of thousands of blocks representing primitive and aggregate computations, algorithms, and operations. The subsystem can also be atomic, and thus enable a separate execution order of blocks in the subsystem and components of the blocks in the subsystem. For example, when the output of the subsystem is required, the output of all the blocks in the subsystem can be computed prior to the computation of the output of blocks that are at the same hierarchical level as the subsystem block such as block 515. Subsystems provide the ability to control when the contents of the subsystem are evaluated based on a condition. Conditionally executed subsystems are executed, for example, only when a transition occurs on a triggering, function-call, action, or enabling input and may be referred to as enabled subsystems.

The subsystem block 520 can be a configurable subsystem such that the implementation of the subsystem block 520 can be determined during the execution of the block diagram 510. A configurable subsystem can provide a user with options for setting a parameter during design time. The option is provided using a pop-up menu in the block diagramming environment such that when the configurable subsystem is called a menu is displayed to the user that allows the user to configure the parameters of the subsystem. The configuration of a configurable subsystem can be administered during execution and invoked by the caller. As a result, parameters of the configurable callee subsystem may be changed depending on computations that are performed during execution.

Figure 5B:
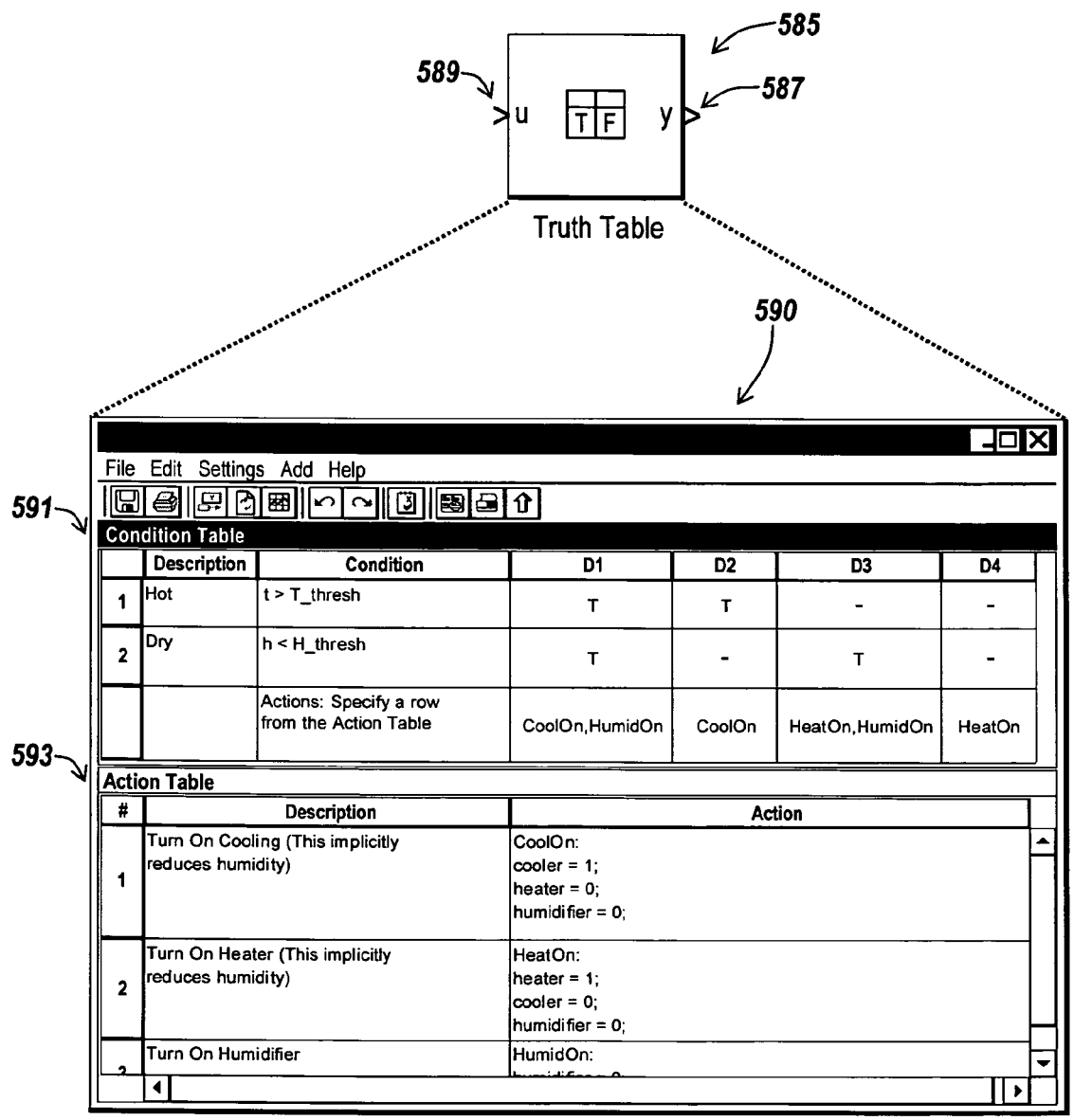
FIG. 5B depicts a truth table block that can be used in accordance with the illustrative embodiment of the present invention.

Conversely, the Embedded MATLAB block 515 or Simulink® subsystem block 520 may be a Truth Table Block that provides a truth table function in a block diagram. An example of a Truth Table Block is depicted in FIG. 5B. The Truth Table Block 585 supports the Embedded MATLAB language for programming conditions and actions, and generates content as Embedded MATLAB code. A user may access and edit information contained in the Truth Table Block 585 by selecting the block with a pointing device. Upon selecting the Truth Table Block, a window 590 appears that allows the user to view or edit the truth table. The window 590 may have a portion for conditions that may be referred to as condition table 591 and a portion for actions that take place when the conditions are met that may be referred to as an action table 593. In this manner, conditions and actions are separated and actions can be referenced from the conditions. The Truth Table Block 585 may receive inputs from other blocks and provide outputs to other block in the block diagram. For example Truth Table 590 has an input port, u 589, and an output port, y 587. The truth table block can include an action that provides a call command that calls another block in the block diagram or a file located, for example, in the computing device or in a server on a network. A truth table block can be debugged directly or can be translated into a flow diagram representation, which helps a user debug the truth table by allowing the user to access each step in the truth table execution. In addition, a truth table block is operable to eliminate conditions that can never be executed. For example, if a truth table of a truth table block provides all the possible conditions, subsequent condition are never executed, a situation similar to dead code in programs. These conditions may be removed from the truth table block. A truth table of the truth table block can be used to generate C or C++ code that represents the truth table, or the truth table can be used to generate a hardware or wetware description language representation of the truth table.

Block 520 (the callee block) executes upon receiving a trigger from block 515 (the caller block). In the present example, block 520 is a triggered subsystem whose execution is determined by logic internal to block 515. A subsystem so configured is called a function-call subsystem. Block 520 defines an output y to be output on output port 1 of block 520.

According to the present example, block 515 (the caller block) executes the call command 565 that is included in the sequence of commands 560 (Step 420). Upon executing the call command 565, block 515 calls block 520 (the callee block) using the output port defined as fco (Step 430). In this manner, block 515 provides a trigger to block 520. When block 520 receives the trigger from block 515, block 520 executes. The execution of a graphical block 520 is determined by control logic internal to a non graphical block 515. The callee block can adopt sample rates on its interface, data types, dimensions, complexity from the caller block or may provide these parameters independently. The callee block may also be configured to disable menus and options in the graphical modeling environment such as disabling parameter changes.

Scope 525 of the block diagram 510 receives as inputs the outputs of blocks 515 and 520 and provides a display (not shown) to depict the output waveforms that are associated with blocks 515 and 520.

Further, while the block 520 (callee) is illustrated as being in the block diagram 510, the illustrative embodiment enables the block 520 to be referenced by the block diagram such the block 520 is not actually in the block diagram 510, but is incorporated by reference. As such, the block 520 may reside in a distinct file that is stored according to a storage path, for example, in the computing device or in a server on the network, where the file can be accessed by local or global referencing that includes a storage path or a network path. Further, the block 520 can be implemented as, for example, a JavaScript that is accessed via a uniform resource locator (URL).

The JavaScript may receive values from the block diagram and may return values to the block diagram for further processing. In addition, the block 520 can be configured to programmatically and dynamically perform a system call that enables a network command to be issued in a protocol such as RS-232 to control the functionality of an instrument, such as an "autoscale" function of an oscilloscope. The block 520 can also be configured to dynamically measure and/or display values of specific variables of the block diagram during execution. The block 520, for example, can dynamically provide additional scopes during execution to measure and/or display the values of the specific variables. Further, the callee entity can be configured to dynamically change a textual aspect of an entity in the block diagram and save the change during the execution of the block diagram such that the change can be executed during the execution.

In addition, the call command 565 can alternately be a service request using multi-thread technology, or middleware technology such as CORBA or DCOM. In this case, the call command can be a synchronous type communication that halts execution of the block diagram until a return value is available.

Lines 502 and 504 represent signals that are output from blocks 515 and 520 that are input to scope 525. Dashed line 506, however, is shown to depict that block 515 provides a function-call trigger to block 520. In some embodiments, the dashed line 506 may be removed from the diagram. The line styles used to depict the various associations in the block diagram 510 can take many forms. For example, the lines may be represented by different colors, dotted lines, double lines or triple lines.

Further, the illustrative embodiment can provide scoped references that use labels of ports, instead of, or in addition to lines to indicate a connection between blocks and to indicate that blocks are in the same scoped area. In this case, the labels of the ports can be demarcated by graphical outlines such as rectangles, circles or ellipses, where the outlines can have a solid or dashed line style. The blocks in the block diagram can have both input and output ports. In addition, the ports of a block can be indicated by shapes such as triangles, circles, arrows, diamonds, and the shapes may be transparent or shaded with colors.

The scoping provided by the illustrative embodiment can be used to set a scoped area that defines a hierarchy of a block diagram to control the operation and interaction of the blocks contained in the block diagram. For example, a scope can be defined to include the subsystem block 520 such that the subsystem block 520 is at the top of the hierarchy. In this case, only blocks that are included in the hierarchy of the block 520 can pass arguments between each other. That is, the scope of the operation of the block included in the subsystem can not exceed the scope of the subsystem since the subsystem defines the top of the hierarchy. To provide the scope described above, the illustrative embodiment may provide a specified block that can be referred to as a masked subsystem.

The scoping area can also be used to control the execution of a callee block such that the callee block could invalidate a call from a caller block according to a specified restriction. For example, the callee block can provide a scope that indicates that the callee block is only eligible to receive a call from a caller block when the call command of the caller block is executed in a main sequence of a sequence of commands. In this manner, if the call command is executed during an if loop (i.e., not during the main sequence), the callee block is not eligible to receive the call from the caller block since the scope of the callee block has been limited.

In one embodiment of the present invention, dashed line 506 may be replaced with a hyperlink. This is particularly useful when the caller block and the callee block are spaced far apart and a dashed line is not convenient. The hyperlink provides a selectable connection from the caller block to the callee block. For example, a user may select the call command in the sequence of commands of the caller block. If the user selects the hyperlink, the corresponding callee block is identified as being associated with the call command in the sequence of commands of the caller block by the hyperlink. When the hyperlink is selected the callee block may be highlighted or may open in another window. The hyperlink can also reference a uniform resource location (URL) such that when the hyperlink is selected a JavaScript that is on the Internet or a network is accessed. The JavaScript can be encrypted to prevent unauthorized use.

Figure 5C:
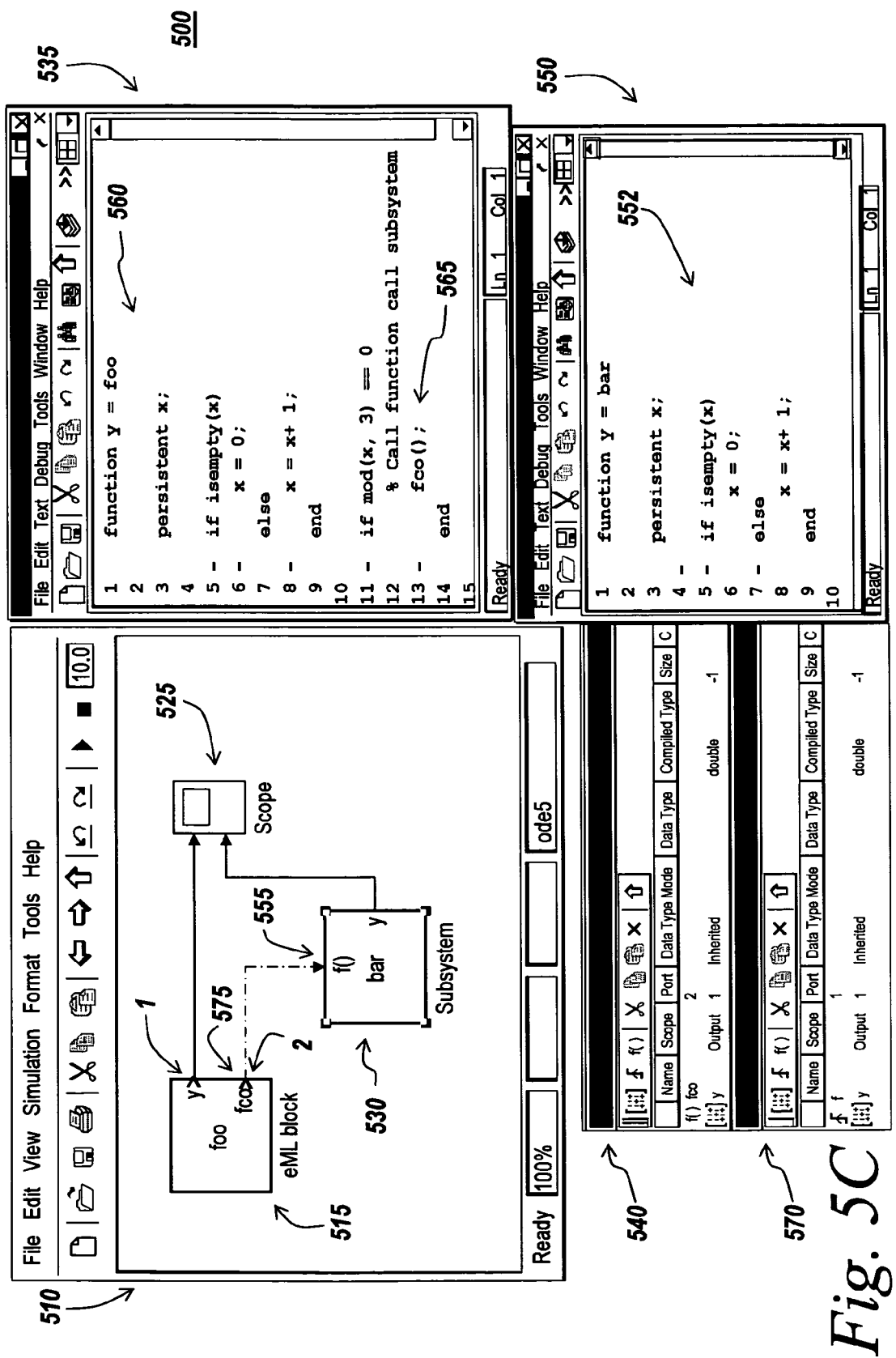
FIG. 5C illustrates a block diagram for calling a non-graphical block with a non-graphical block in accordance with the illustrative embodiment.

FIG. 5C illustrates another block diagram that may be implemented by the steps provided as discussed above with respect to FIGS. 4 and 5. The block diagram environment 500 includes the Embedded MATLAB block 515, an Embedded MATLAB block 530, the scope 525, the Embedded MATLAB script window 535, and Embedded MATLAB script window 550, the port and data management window 540 and the port and data management window 570.

Block 515 executes a sequence of commands 560. The sequence of commands 560 executed by block 515 includes a call command 565, as a function call, that defines a function call output, "fco". The fco is defined to be at an output port 2 575 of the block 515 in port and data management window 540. Block 515 also has an output y defined to be output on port 1 of block 515.

Block 530 (the callee block) executes a sequence of commands 552 upon receiving a trigger from block 515 (the caller block). Block 530 defines an input trigger 'f' 555 in the port and data management window 570. In the present example, block 530 is an Embedded MATLAB block. Upon executing the call command 565, block 515 calls block 530 (the callee block) using the output port defined as fco (Step 430). In this manner, block 515 provides a trigger to block 530. When block 530 receives the trigger from block 515, block 530 executes. With this configuration, the execution of a non-graphical block 530 is determined by a call command provided by non graphical block 515.

Figure 6:
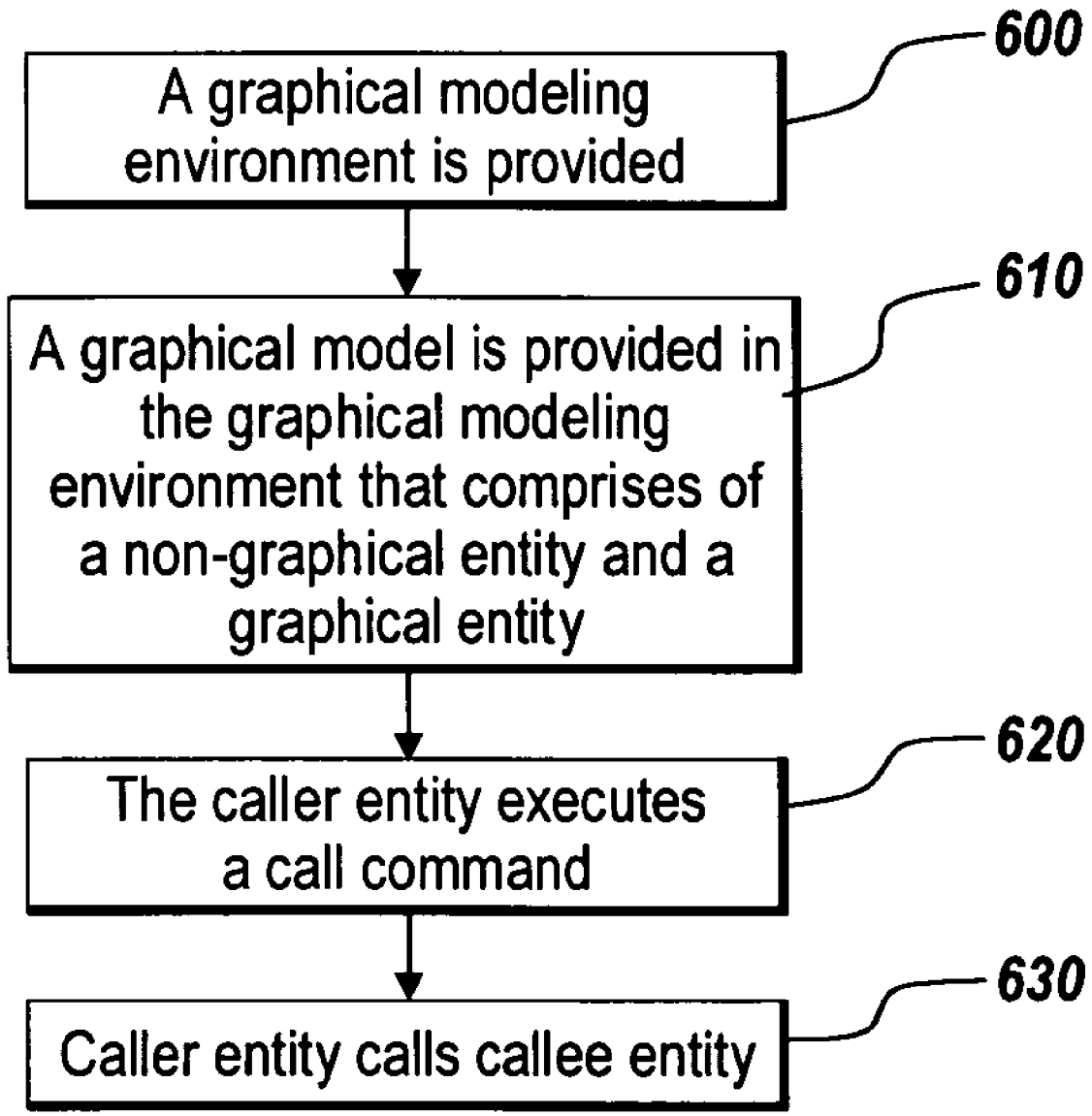
FIG. 6 depicts a flow diagram illustrating the steps performed in another aspect of the illustrative embodiment of the preset invention that allows a graphical block in a block diagram to execute a call command to call a non-graphical block using the call command.
Figure 7:
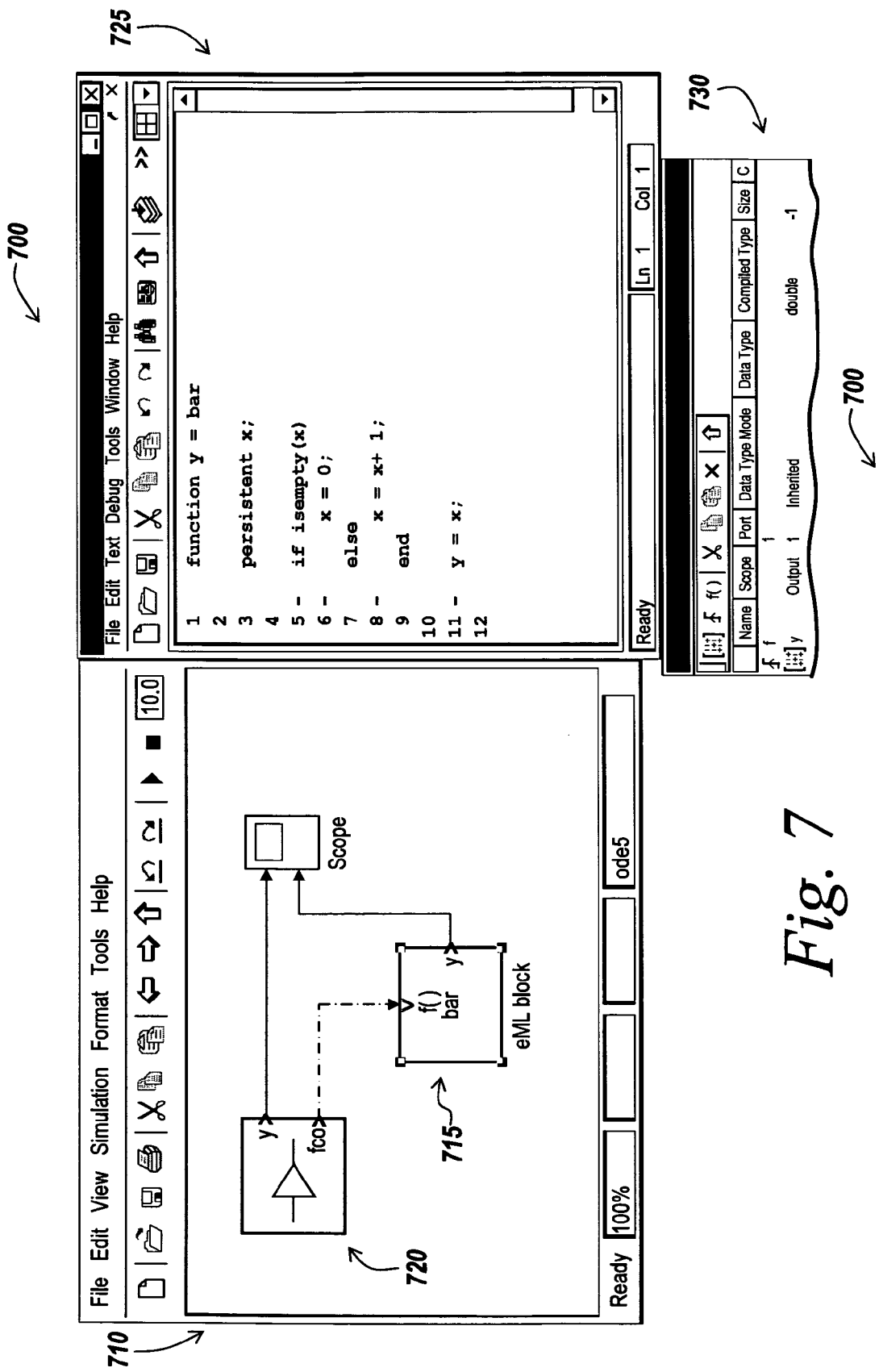
FIG. 7 depicts another exemplary block diagram and associated embedded code that is suitable for implementing the steps performed in FIG. 6.

The present invention also provides the capability to call a non-graphical entity using a graphical entity in a graphical model. FIG. 6 provides a flow diagram for implementing a call command to call a non-graphical entity with a graphical entity. FIG. 7 provides a block diagram that is suitable for implementing the flow diagram of FIG. 6. In this example, a block diagramming environment 700 is provided (Step 600). Further, a block diagram 710 is provided that comprises a non-graphical entity 715 such as an Embedded MATLAB block and a graphical entity 720 such as a Simulink® Subsystem (Step 610). The block diagramming environment also provides an Embedded MATLAB script window 725 and port and data management window 730. Block 715 has a block name of "eML block" and a function name of "bar." The function name represents the name of the function that is performed by the sequence of commands when an Embedded MATLAB block executes.

In this example, when block 720 (the caller block) executes, it provides a trigger output that is received by block 715 (the callee block) (step 620). In this manner, block 720 calls block 715 using an output port defined on block 720 (step 630). When block 715 receives the trigger from block 720, block 715 executes a sequence of commands. With this configuration, the execution of block 715 is determined by control logic internal to block 720.

In another aspect of the present invention, a non-graphical or textual entity can call a graphical or non-graphical entity or a graphical entity can call a non-graphical entity without defining a function-call output port on the caller block and an input trigger port on the callee block to facilitate resolving the call.

Figure 8:
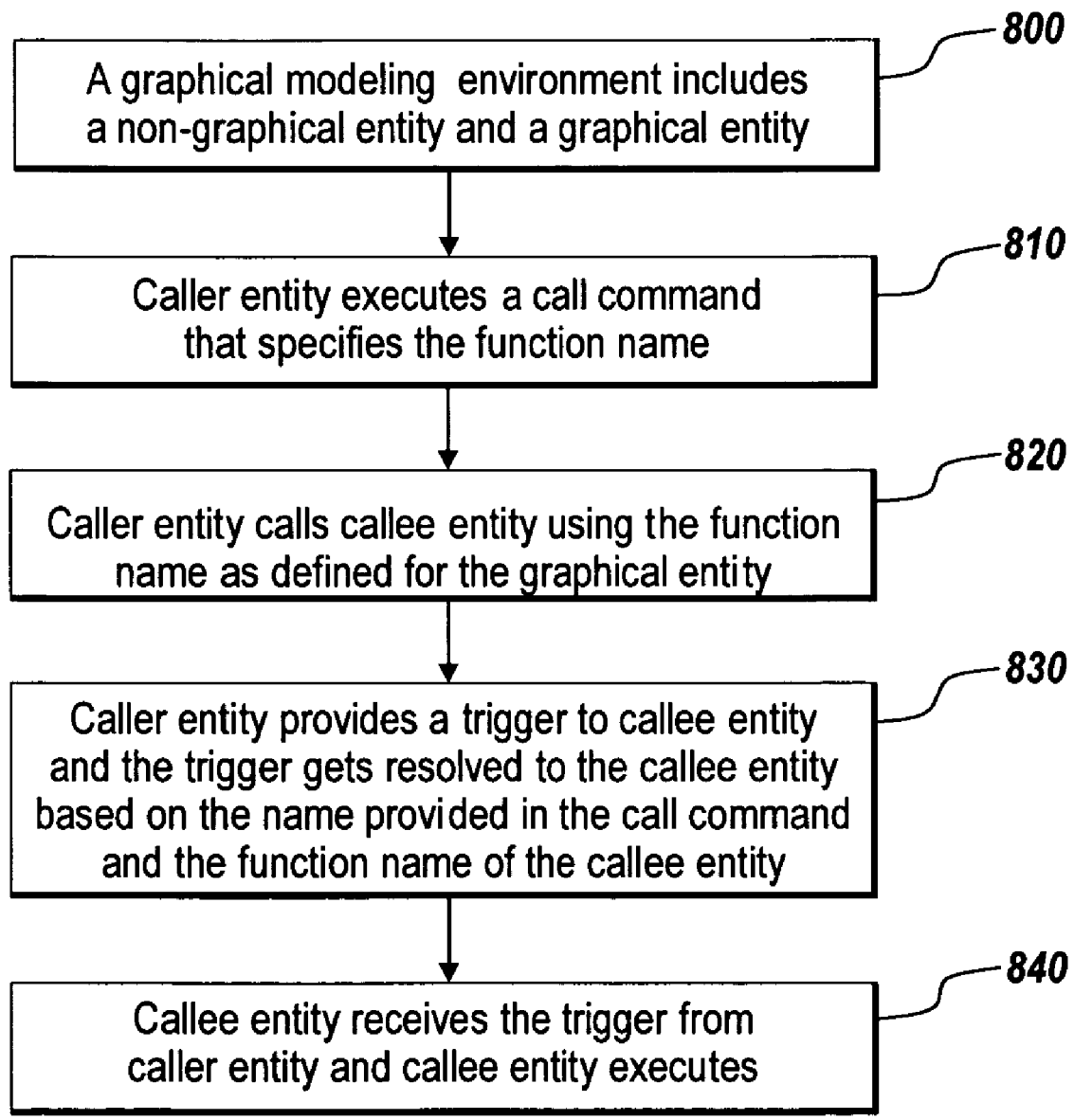
FIG. 8 depicts a flow diagram illustrating the steps performed for allowing a call to be resolved using the name and signature of a block in a block diagram.
Figure 9:
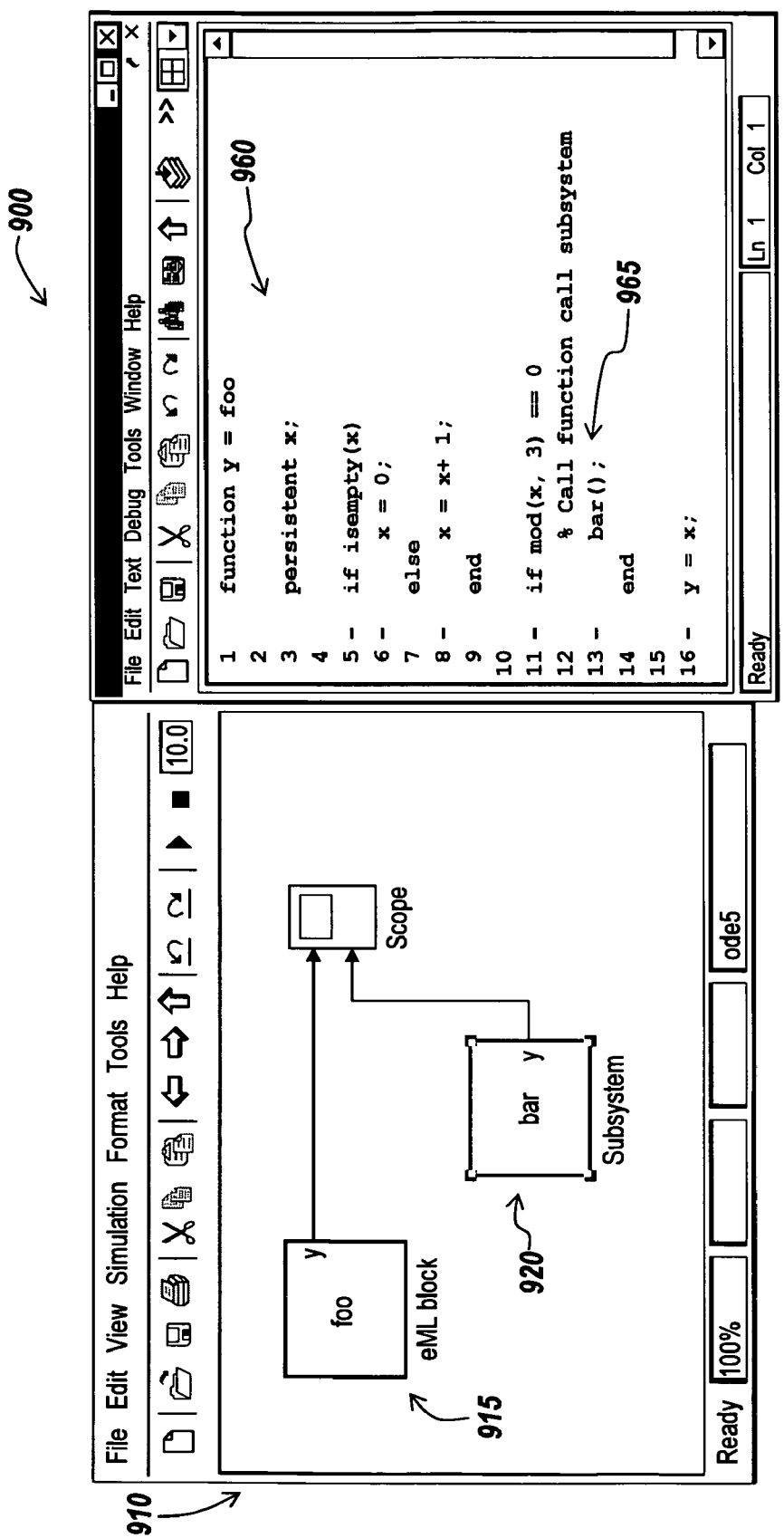
FIG. 9 depicts another exemplary block diagram and associated embedded code suitable for implementing the steps performed in FIG. 8 that allows a call command of a caller block to be resolved using the name and signature of an a callee block in the block diagram.

For example, referring to FIGS. 8 and 9, a block diagram 910 in a block diagramming environment 900 may include a non-graphical block 915 such as an Embedded MATLAB block and a graphical block 920 such as a Simulink® subsystem (Step 800). Non-graphical block has a block name of "eML block" and a function name of "foo." Graphical entity 920 has a block name of "Subsystem" and a function name of "bar."

Unlike the previous examples, the caller block (the non graphical block in this example) does not define an output port on the block for the function-call output, and the callee block (the graphical block in this example) does not define an input trigger port on the block for the input trigger. Instead the graphical block is given a function name "bar." The non-graphical block calls the graphical block using the function name of the graphical block. So when block 915 executes the call command 965 that specifies the function name "bar" as included in the sequence of commands 960 (Step 810), block 915 calls block 920 using the function name as defined for the graphical block 920 (Step 820). In this manner, block 915 provides a trigger to block 920. The trigger gets resolved to block 920 based on the name provided in the call command and the function name of block 920 (Step 830). When block 920 receives the trigger from block 915, block 920 executes (Step 840).

As discussed above, the illustrative embodiment can provide scoped references that use labels of ports, instead of, or in addition to lines to indicate a connection between entities. The labels of the ports can be demarcated by graphical outlines such as rectangles, circles or ellipses, where the outlines can have a solid or dashed line style. The entities in the graphical model can have both input and output ports. In addition, the ports of a block can indicate the semantics of a caller by employing shapes such as triangles, circles, arrows, diamonds, and the shapes may be transparent or shaded with colors. In addition, the scope area can be set to encompass specific entities in the graphical model or the scope can be defined using a masked subsystem, which can provide a hierarchical scoping mechanism such that the subsystem that is masked defines the top of the hierarchy. Variables within the scoping area can be global such that each function within the scoping area can access the same variables if the variables are accessible at the scoped level.

The illustrative embodiment of the present invention provides for function overloading. Function overloading refers to the ability to use the same name for more than one function. Using function overloading requires a function calls be resolved based on the name of the function and a signature associated with that function. A signature may be a number of input arguments or output arguments, a total number of arguments, dimensions of the arguments, complexity of the arguments, sample times of the arguments or the type of arguments associated with an entity of a graphical model. Some examples of types include, but are not limited to, floating point and integer. Some examples of dimensions include, but are not limited to, a one dimensional array, a multi-dimensional array or serial and parallel data of any bit length or width, respectively. The complexity of the arguments indicates whether an argument is real or whether it includes an imaginary part as well. The sample times of the arguments refers to a parameter that can be set in accordance with the illustrative embodiment that allows a user to specify periodic time periods for sampling each of the arguments.

In the illustrative embodiment of the present invention, the number of input arguments and/or output arguments can be variable such that a subset of input arguments and/or output arguments can be passed from one entity to another. The subset of arguments can be explicitly defined by connecting a specified subset of arguments of the caller entity to the specified number of arguments on the callee entity using a line in the graphical model. The number of arguments can also be implicitly variable. In this manner, no explicit connections are made, but rather, the call command itself identifies the subset of arguments that are passed from one entity to another. Defining the subset of arguments implicitly eliminates the need for lines to connect output arguments of one entity to input arguments of another entity.

While the examples of implementation of the illustrative embodiment discussed herein illustrate resolving a command call from a single caller entity to a single callee entity, the illustrative embodiment further enables a single caller entity that calls multiple callee entities with a call command. In accordance with the illustrative embodiment, a caller entity can execute a call command that provides a trigger to multiple callee entities. For example, the caller entity may provide a function call that identifies a name of the function to be called. The function name that is provided by the caller entity can correspond to multiple entities such that the function call is resolved to each callee entity.

Further, the illustrative embodiment enables multiple caller entities that call a single callee entity with a call command or a single caller entity that can call multiple callee entities. For example, each caller entity can execute a call command that provides a trigger to a single callee entity. The call commands can be a function call that provides a function name corresponding to the single callee entity such that each function call is resolved to each callee entity. In this manner, the callee entity can receive one function call at a time. Alternatively, a single caller entity can call multiple callee entity such that each callee entity can be called simultaneously. A line with multiple branches can be used to represent a call from a caller to multiple callee or multiple callers to a single callee. The modeling environment may also provide a mux block, a merge block or any graphical entity to control the order of execution of the call(s) provide by the call command(s).

In accordance with the illustrative embodiment, each call command from each caller entity can have a priority to determine the order in which the function calls are resolved. In this case, a priority based switch can be used to resolve the function calls based on the priority of each function call.

In addition, if a single caller entity calls two or more callee entities, the order in which the callee entities are executed can be determined based on a dependency analysis. The dependency analysis determines whether the input to a callee is dependent on the output of another callee. For example, if a graphical model includes a first callee and a second callee entity, where the callee entities are called simultaneously from a caller entity and the execution of the first callee entity depends on the output of the second callee entity, the second callee entity is executed first such that the output of the second entity is available when the execution of the first entity begins.

Figure 10:
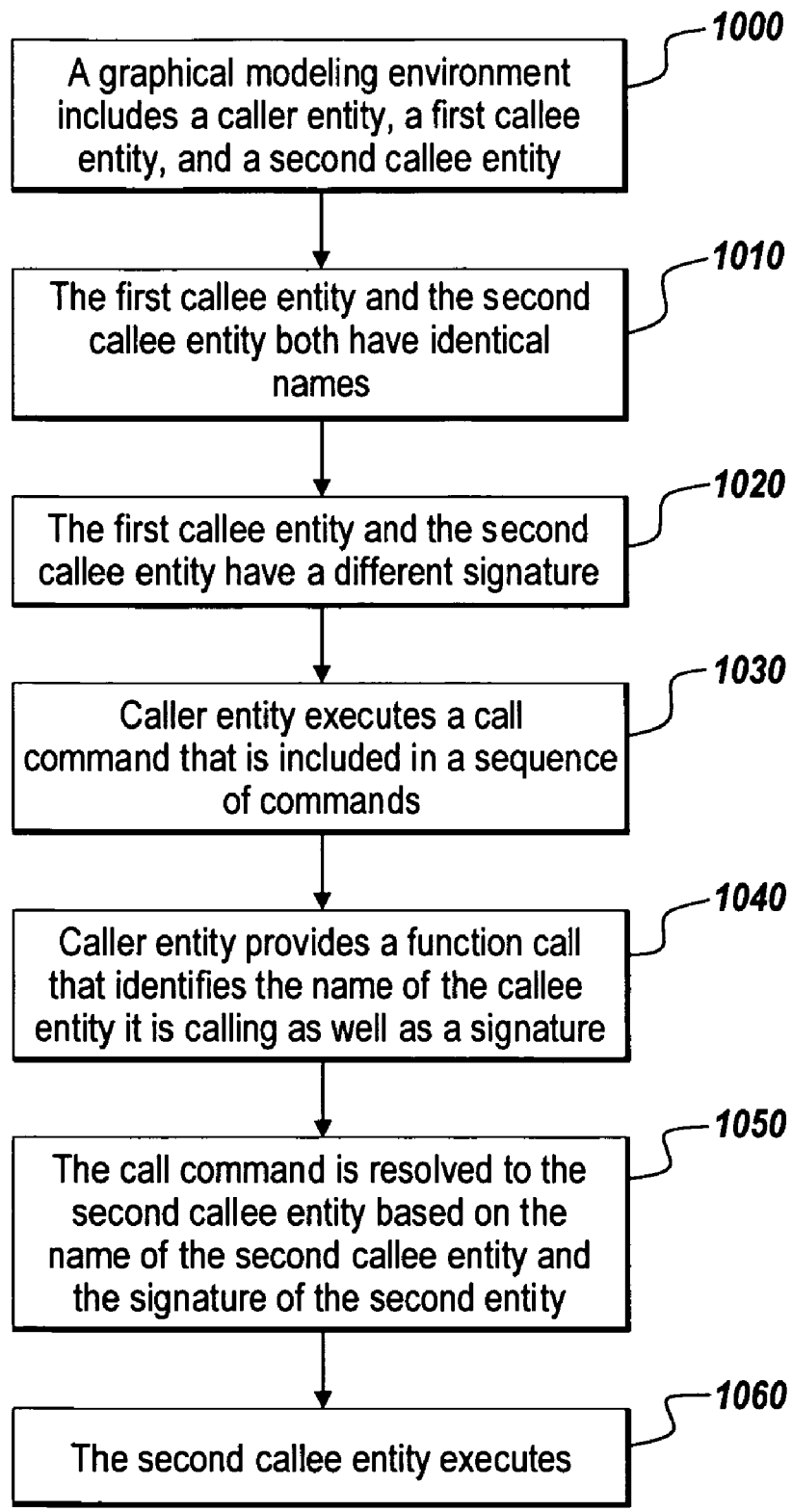
FIG. 10 depicts a flow diagram for implementing function overloading in accordance with the illustrative embodiment of the present invention.
Figure 11:
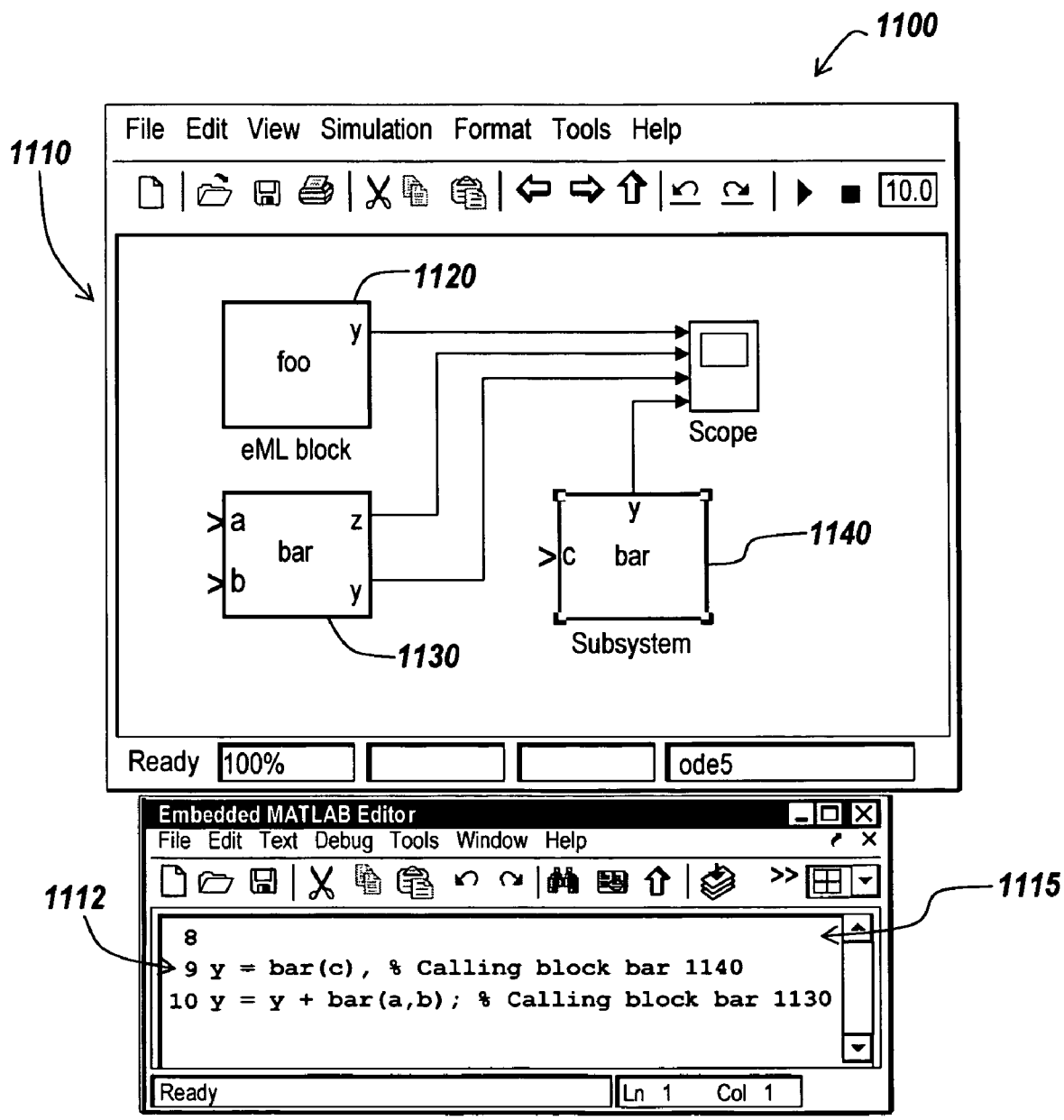
FIG. 11 depicts an additional block diagram that illustrates function overloading in accordance with the illustrative embodiment of the present invention.

FIG. 10 depicts a flow diagram for implementing the function overloading aspect of the illustrative embodiment. FIG. 11 depicts a graphical representation of the function overloading aspect of the illustrative embodiment. A block diagram 1110 in a block diagramming environment 1100 includes blocks 1120, 1130 and 1140 (Steps 1000 and 1010). Block 1120 represents a caller block and in this example is a non-graphical entity such as an Embedded MATLAB block. Blocks 1130 and 1140 represent graphical elements of the block diagram, such as Simulink® subsystems. In this example, blocks 1130 and 1140 both have identical function names, "bar" (Step 1020). Block 1130 however accepts two arguments, while block 1140 accepts only one (Step 1020).

When block 1120 executes a call command 1112 that is included in a sequence of commands 1115 (Step 1030), block 1120 provides a function call that identifies the name of the function it is calling as well as the number of arguments the function accepts (Step 1040). For example, block 1120 executes the call command 1112, in this case a function call, which calls the function name "bar" and specifies that the function accepts only one argument. Therefore, the function call is resolved to block 1140 based on the number of arguments that the function accepts as defined by block 1140 accepts (Step 1050). After the function call is resolved block 1140 executes (Step 1060).

Although, the example provided above of the function overloading feature of the illustrative embodiment of the present invention discusses function overloading with respect to a non-graphical block that is operable to call a graphical block, the illustrative embodiment of the present invention also enables function overloading for the case where a graphical block calls a non-graphical block.

The execution of a non-graphical model can be independently supported by the graphical modeling environment or can be executed through an underlying interface. For example, the non-graphical entity can be an Embedded MATLAB® block in a Simulink® block diagram. During the execution of the block diagram, MATLAB® can be used to execute the Embedded MATLAB® block. In one aspect, the contents of the Embedded MATLAB® block are analyzed when the block diagram is compiled and all dependencies are evaluated in MATLAB® and then included explicitly in a shared library. The non-graphical entity can also be a non-graphical entity that provides a sequence of commands in a programming language, such as Python, C, C++ or Java.

In accordance with the illustrative embodiment, the graphical modeling environment can provide an execution mode where the graphical model is a graphical front-end such that the execution of the graphical model occurs in real-time on a host computing device such as computing device 200 or client 330 or a target computing device such as the server 320. In this execution mode, the graphical modeling environment downloads all parameters of the graphical model to the host or target computing device. The graphical model is executed on the host or target computing device. During execution any changes made to the graphical model can be downloaded to the host or target computing device. During or upon completion of the execution the graphical modeling environment can receive data from the target or host computing device relating the execution of the graphical model.

In addition the illustrative embodiment enables a caller entity to execute a call command, where the call command does not fully identify the callee entities. For example, a block diagram can include a first caller block, a second callee block and a third callee block. The second callee block is represented by the name "foo" and the third callee block is represented by the name "boo". The caller block can execute a call command that identifies "?oo" as the callee block that is to be called. The "?" in the call command represents any character and can be referred to as a wild card. In this example, when the call command is executed both callee blocks are called.

Figure 12:
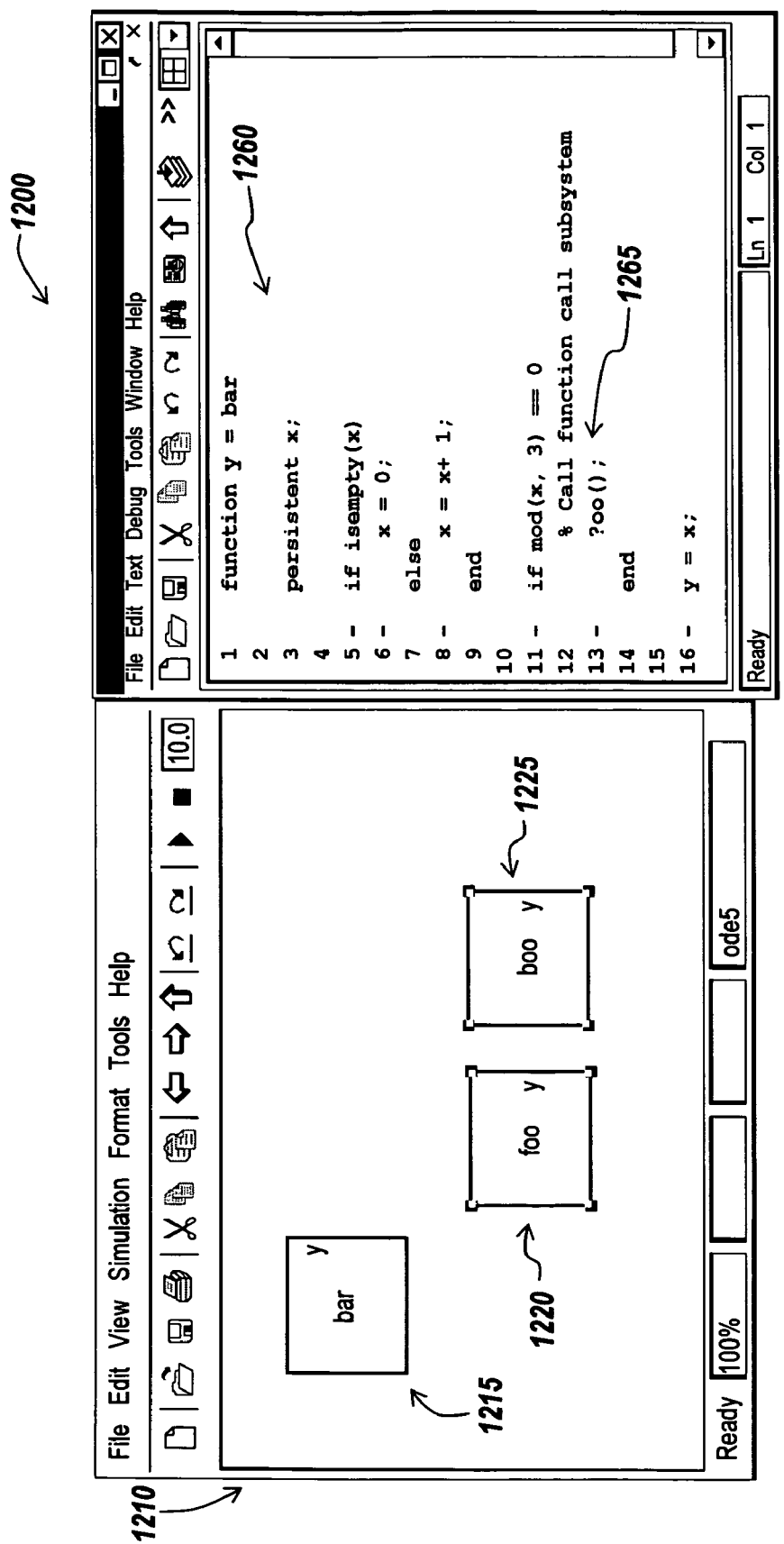
FIG. 12 depicts a block diagram that illustrates a call command that partially identifies a callee entity in accordance with the illustrative embodiment of the present invention.

FIG. 12 illustrates the wild card feature in the modeling environment. A block diagram 1210 is provided in the block diagramming environment 1200 and includes a first block 1215, a second block 1220 and a third block 1225. The first block 1215 is a non-graphical block that includes a call command 1265 that uses a wild card represented by "?" to identify the name of the callee blocks. The second and third blocks 1220 and 1225, respectively, are graphical blocks that can be called by the block 1215. It will be recognized by one skilled in the art that the block 1215 can be a graphical block and that blocks 1220 and 1225 can be non-graphical blocks. The block 1220 is represented by a name "foo" and the block 1225 is represented by a name "boo". When the call command 1265 is executed the call command is resolved to the callee blocks that match the call command 1265. In this manner, any block that has a name that is three characters where the last two characters are "oo" is called be the wild card call command. Therefore, the blocks 1220 and 1225 are called when the call command 1265 is executed. As discussed above, the execution of the sequence of commands can occur within the graphical modeling environment or can occur through an underlying interface such as MATLAB® or any other textual interface or textual programming environment.

While the "?" symbol is used to illustrate the illustrative embodiment of the present invention one skilled in the art will recognize that other symbols and characters such as "*" can be used to represent a wild card and that one or more characters in the call command can be represented by the wild card symbol.

The present invention may be provided as one or more computer-readable programs embodied on or in one or more mediums. The mediums may be, but are not limited to a hard disk, a compact disc, a digital versatile disc, a flash memory card, a PROM, a RAM, a ROM, a magnetic tape, or even the genome in a cell nucleus. In general, the computer-readable programs may be implemented in any programming language. Some examples of languages that can be used include Python, C, C++, C#, or JAVA. Further, the computer readable programs can be implemented in a hardware description language or any other language that allows prescribing computation such as, for example, DNA. The software programs may be stored on or in one or more mediums as object code.

Certain embodiments of the present invention are described above. It is, however, expressly noted that the present invention is not limited to these embodiments, but rather the intent is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computing device-implemented method for generating and executing an executable representation of a first graphical model to simulate the first graphical model, the method comprising:
generating the executable representation of the first graphical model, where:
the first graphical model including entities,
one or more of the entities is a caller entity,
the caller entity is a non-graphical entity or a graphical entity, and
the non-graphical entity comprises textual code;
executing the executable representation of the first graphical model, wherein the executing comprises:
executing a call command associated with a caller entity of the first graphical model, the call command including a name of a callee entity;
identifying the callee entity based on the name of the callee entity provided in the call command; and
calling the callee entity, where:
the callee entity is a graphical entity in a second graphical model when the caller entity is a non-graphical entity in the first graphical model, wherein the non-graphical entity:
automatically defines a new output port, the new output port being graphically represented in the first graphical model, and
provides a trigger to the graphical entity at the new output port for execution of the call command, the graphical entity receiving the trigger at an input port graphically represented in the second graphical model;
or
the callee entity is a non-graphical entity in the second graphical model when the caller entity is a graphical entity in the first graphical model, wherein the non-graphical entity:
automatically defines a new input port, the new input port being graphically represented in the second graphical model, and
receives a trigger from the graphical entity at the new input port for execution of the call command, the graphical entity providing the trigger at an output port graphically represented in the first graphical model.

2. The method of claim 1, wherein the caller entity comprises one of: a graphical block or a non-graphical block, wherein actions associated with the graphical block are implicit to a type of the graphical block and wherein actions associated with the non-graphical block are textually defined in association with the non-graphical block, and
wherein the callee entity comprises one of: a graphical block or a non-graphical block.

3. The method of claim 1, wherein the second graphical model is same as the first graphical model.

4. The method of claim 1, wherein the second graphical model is separate from the first graphical model.

5. The method of claim 1, further comprising identifying the callee entity based on the name of the callee entity and a signature provided in the call command.

6. The method of claim 5, wherein the signature comprises a value representing a number of arguments associated with the caller entity.

7. The method of claim 5, wherein the signature comprises at least one of: a value representing a number of dimensions of caller arguments, a value representing a complexity of the caller arguments, a value representing sample times of the caller arguments, or a value representing a type of caller argument.

8. The method of claim 1, wherein the call to the callee entity includes a designation of caller arguments passed to the callee entity.

9. The method of claim 1, further comprising:
identifying multiple callee entities based on the name of the callee entity included in the call command; and
calling the multiple callee entities.

10. The method of claim 9, further comprising:
determining a call order associated with the multiple callee entities; and
calling the multiple callee entities in an order based on the call order.

11. The method of claim 10, wherein determining the call order comprises:
determining dependencies between individual ones of the multiple callee entities; and
determining the call order based on the dependencies.

12. The method of claim 1, further comprising:
graphically identifying the call command by a line connecting the caller entity and the callee entity.

13. The method of claim 1, further comprising:
graphically identifying the call command by a hyperlink connecting the caller entity and the callee entity.

14. The method of claim 1, wherein the call command includes a call to a callee entity based on a partial name of the callee entity.

15. The method of claim 1, wherein the partial name of the callee entity includes one or more wildcard characters enabling a single call command to identify multiple callee entities having different names.

16. A computer-readable medium that stores instructions executable by at least one processor for generating and executing an executable representation of a graphical model to simulate the graphical model, the computer-readable medium comprising one or more instructions for:
generating the executable representation of the graphical model, where:
the graphical model including entities,
one or more of the entities is a caller entity,
the caller entity is a non-graphical entity or a graphical entity, and
the non-graphical entity comprises textual code;
executing the executable representation of the graphical model, wherein the executing comprises:
executing a call command associated with a caller entity contained in the graphical model, the call command including a name of a called entity, where:
the caller entity is a graphical entity in the graphical model and the called entity is a non-graphical entity in the graphical model, wherein the non-graphical entity:
automatically defines a new input port, the new input port being graphically represented in the graphical model, and
receives a trigger from the graphical entity at the new input port for execution of the call command, the graphical entity providing the trigger at an output port graphically represented in the graphical model, or
the caller entity is a non-graphical entity in the graphical model and the called entity is a graphical entity in the graphical model, wherein the non-graphical entity:
automatically defines a new output port, the new output port being graphically represented in the graphical model, and
provides a trigger to the graphical entity at the new output port for execution of the call command, the graphical entity receiving the trigger at an input port graphically represented in the graphical model; and calling the callee entity.

* * * * *